United States Patent
Aarnos et al.

(10) Patent No.: US 6,931,453 B2
(45) Date of Patent: Aug. 16, 2005

(54) METHOD AND APPARATUS FOR RESOLVING PROTOCOL-AGNOSTIC SCHEMES IN AN INTERNET PROTOCOL MULTIMEDIA SUBSYSTEM

(75) Inventors: Jyrki Aarnos, Kangasala (FI); Jose Costa-Requena, Helsinki (FI); Hisham Khartabil, Helsinki (FI); Ilkka Westman, Helsinki (FI)

(73) Assignee: Nokia Corporation, Espoo (FI)

( * ) Notice: Subject to any disclaimer, the term of this patent is extended or adjusted under 35 U.S.C. 154(b) by 133 days.

(21) Appl. No.: 10/336,643

(22) Filed: Jan. 3, 2003

(65) Prior Publication Data

US 2004/0205241 A1 Oct. 14, 2004

(51) Int. Cl.$^7$ ............... G06F 15/16; H04Q 1/20; H04J 3/22

(52) U.S. Cl. .......... 709/245; 709/227; 375/224; 370/466

(58) Field of Search ............... 709/217, 227, 709/228, 230, 231, 245; 707/3, 7; 375/224; 370/466, 467

(56) References Cited

U.S. PATENT DOCUMENTS

| | | | | |
|---|---|---|---|---|
| 6,151,624 A | * | 11/2000 | Teare et al. ............ | 709/217 |
| 6,167,449 A | * | 12/2000 | Arnold et al. .......... | 709/227 |
| 6,173,279 B1 | * | 1/2001 | Levin et al. ............ | 707/5 |
| 6,466,570 B1 | * | 10/2002 | Low et al. ............. | 370/352 |
| 6,523,172 B1 | * | 2/2003 | Martinez-Guerra et al. | 717/143 |
| 6,678,717 B1 | * | 1/2004 | Schneider ............. | 709/203 |
| 6,757,722 B2 | * | 6/2004 | Lonnfors et al. ....... | 709/220 |
| 6,788,676 B2 | * | 9/2004 | Partanen et al. ....... | 370/352 |

FOREIGN PATENT DOCUMENTS

WO   WO002102107 A1 * 12/2002   ............ H04Q/7/38

OTHER PUBLICATIONS

Rosenberg et al.; "RFC 3263—Session Initiation Protocol (SIP): Locating SIP Servers" Jun. 2002 Retrieved from http://www.faqs.org/rfcs/rfc3263.html on Jun. 30, 2004.*

Berners–Lee et al.; "RFC 2396–13 Uniform Resource Identifiers (URI): Generic Syntax" Aug. 1998 Retrieved from http://www.faqs.org/rfcs/rfc2396.html on Jun. 30, 2004.*

Bozinovski, M.; Gavrilovska, L.; Prasad, R.; "Performance evaluation of a SIP–based state–sharing mechanism" Vehicular Technology Conference, 2002. Proceedings. VTC 2002–Fall. 2002 IEEE 56th, vol.: 4, Sep. 24–28, 2002 pp.: 2041–2045 vol. 4.*

Grech, M.L.F.; Torabi, M.; Unmehopa, M.R.; "Service control architecture in the UMTS IP multimedia core network subsystem" 3GMobile Communication Technologies, 2002. Third International Conference on (Conf. Publ. No. 489), May 8–10, 2002 □□pp.: 22–26.*

(Continued)

*Primary Examiner*—Willliam A. Cuchlinski, Jr.
*Assistant Examiner*—Tam T. Phan
(74) *Attorney, Agent, or Firm*—Ware, Fressola, Van Der Sluys & Adolphson LLP

(57) ABSTRACT

A method for use by an I-CSCF (12b) in resolving an address of a message according to SIP but using a protocol-agnostic scheme, and corresponding equipment. The method includes: a step (32) of querying a data store (12c) of scheme mappings, in response to receiving such a request, the querying for determining possible mappings to trial schemes at least one of which resolves the address, i.e. which can be used by the I-CSCF (12b) to find the S-CSCF (12e) for the target user (11b) if the target user is an IMS client, or for forwarding to a gateway or next hop in the path to the target user (11b) if the target user (11b) is not an IMS client; and a step (33) of testing in turn (until success or until all possible trial schemes are tested) each possible trial scheme, the testing based on comparing an address using the trial scheme with an address in a data store (12d) of addresses.

8 Claims, 3 Drawing Sheets

OTHER PUBLICATIONS

*Wireless Village—The Mobile IMPS Initiative System Architecture Model*; V 1.1, 2001–2002 Ericsson, Motorola and Nokia.
*Wireless Village—The Mobile IMPS Initiative; Features and Functions*; V1.1, 2001–2002, Ericsson, Motorola and Nokia.
*Wireless Village—The Mobile IMPS Initiative; Client–Server Protocol Transport Bindings*; V.1.1, 2001–2002 Ericsson, Motorola and Nokia.
*Wireless Village—The Mobile IMPS Initiative; Server–Server Protocol XML Syntax Document*; V. 1.1, 2001–2002 Ericsson, Motorola and Nokia.
*Wireless Village—The Mobile IMPS Initiative; Client–Server Protocol DTD and Examples*; V 1.1, 2001–2002 Ericsson, Motorola and Nokia.
*3rd Generation Partnership Project; Technical Specification Group Core Network; IP Multimedia (IM) Subsystem Cx and Dx Interfaces; Signalling flows and message contents; (Release 5)*; 3GPP TS 29.228 V5.1.0 (Sep. 2002).
*Wireless Village—The Mobile IMPS Initiative; SSP—Server to Server Protocol Semantics Document*; V 1.1, 2001–2002, Ericcson, Motorola and Nokia.
*Wireless Village—The Mobile IMPS Initiative; Client–Server Protocol Session and Transactions*; V 1.1, 2001–2002, Ericsson, Motorola and Nokia.
*ENUM Usage Scenarios*; S. Lind, Internet Draft draft–ietf–enum–usage–scenarios—OO.txt, Jun. 6, 2002.
RFC 2778, *A Model for Presence and Instant Messaging*; M. Day et al, Feb. 2000.
H. Sinnreich et al; *Internet Communications Using SIP—Delivering VoIP and Multimedia Services with Session Initiation Protocol*; John Wiley & Sons, New York, 2001, pp. 21–22.
*3rd Generation Partnership Project; Technical Specification Group Services and System Aspects; IP Multimedia Subsystem (IMS); Stage 2 (Release 5)*; 3GPP TS 23.228 V5.6.0 (Sep. 2002).

\* cited by examiner

METHOD AND APPARATUS FOR RESOLVING PROTOCOL-AGNOSTIC SCHEMES IN AN INTERNET PROTOCOL MULTIMEDIA SUBSYSTEM

CROSS REFERENCE TO RELATED APPLICATIONS

Reference is made to co-owned U.S. application Ser. No. 10/265,650 filed on Oct. 3, 2002, and entitled WV-IMS RELAY AND INTEROPERABILITY METHODS.

Reference is also made to co-owned U.S. application Ser. No. 10/336,645, Express Mail No. EV 137072723 US, filed Jan. 3, 2003, and entitled METHOD AND APPARATUS FOR ROUTING WIRELESS VILLAGE MESSAGES IN AN INTERNET PROTOCOL MULTIMEDIA SUBSYSTEM.

The above-referenced applications are assigned to the present assignee. The subject matter of the above applications is hereby incorporated by reference.

TECHNICAL FIELD

The present invention pertains to the field of addressing in telecommunications. More particularly, the present invention pertains to resolving and routing, within an IMS (Internet Protocol Multimedia Subsystem) network, requests with addresses having so-called protocol-agnostic schemes.

BACKGROUND ART

The present invention concerns routing of messages in an Internet Protocol (IP) Multimedia Subsystem (IMS) provided as part of 3GPP (Third Generation Partnership Program) UMTS (Universal Mobile Telecommunications System), as set out in various 3GPP specifications including 3GPP Technical Specification (TS) 23.228, "IP Multimedia Subsystem (IMS); Stage 2." The IP Multimedia CN (core network) subsystem comprises all CN elements for provision of multimedia services, including the collection of signalling and bearer related network elements as defined in 3GPP TS 23.002. IP multimedia services are based on a session control capability defined by IETF (the Internet Engineering Task Force); the session control capability, along with multimedia bearers, utilizes the PS (packet-switched) domain, which may include services equivalent to some services in the CS (circuit-switched) domain.

To achieve access independence and to maintain a smooth interoperation with wireline terminals across the Internet, the IP multimedia subsystem attempts to conform to IETF Internet standards. Therefore, the interfaces specified conform as far as possible to IETF Internet standards for the cases where an IETF protocol has been selected, e.g. the so-called Session Initiation Protocol (SIP).

The IP multimedia core network (IM CN) subsystem, as described in 3GPP TS 23.228, includes inter alia one or another variety of CSCF (call state control function).

A UE (user equipment) uses SIP (Session Initiation Protocol) in communicating with IMS, and the IMS network (i.e. more specifically, the IM CN) is responsible for routing the SIP messages/requests to the recipients. In routing a message, the IMS uses the request URI (uniform resource identifier) of the message to find the S-CSCF (serving CSCF) serving the target user; that S-CSCF finally delivers the request e.g. to the target user (e.g. a terminating UE) via certain intermediate CSCF elements. The scheme of an address of a message, or more properly of the request URI of the message, is the part of the URI that tells a client (such as e.g. an HTML client or an XML client), such as a browser, which access method to use to access the resource specified in the URI, or in other words which protocol(s) to use. A scheme consists of a token followed by a colon and placed at the beginning of an address (e.g. 'sip:' or 'wv:' or 'mailto:' or 'http:').

As stated in RFC 3261 ("SIP: Session Initiation Protocol," by the Network Working Group of the Internet Engineering Task Force, available on the Internet at http://www.faqs.org/rfcs/rfc3261.html), a request URI is a SIP URI or a SIPS URI (as described in Section 19.1 of RFC 3261) or a general URI (as defined in RFC 2396). A request URI indicates the user or service to which a request is being addressed. SIP elements may support request URIs with schemes other than "sip:" and "sips:" such as for example the "tel:" URI scheme of RFC 2806 ("URLs for Telephone Calls," by the Network Working Group, available on the Internet at http://www.faqs.org/rfcs/rfc2806.html). SIP elements may translate non-SIP URIs using any mechanism at their disposal, resulting in a SIP URI, SIPS URI, or some other scheme.

The generic syntax for a SIP URI is defined in RFC 3261 and is as follows:

```
SIP-URI = "sip:" [ userinfo "@" ] hostport uri-parameters [ headers ]
userinfo = [ user | telephone-subscriber [ ":" password ] ]
hostport = host [ ":" port ]
host = hostname | IPv4address | IPv6reference
hostname = * ( domainlabel "." ) toplabel [ "." ]
uri-parameters = * ( ";" uri-parameters )
uri-parameter = transport-param / user-param / method-param /
    ttl-param / maddr-param / lr-param / other-param
transport-param = "transport=" ( "udp" / "tcp" / "sctp" /
    "tls" / other-transport )
other-transport = token
user-param = "user" ( "phone" / "ip" / other-user )
other-user = token
```

For presence and (instant) messaging, IETF suggests the usage of protocol-agnostic schemes (meaning schemes that do not indicate a particular protocol) and provides 'im:' and 'pres:' as such schemes; ('im:' and 'pres:' are specified in draft-ietf-impp-cpim-03, not yet an RFC). The purpose of the schemes 'im:' and 'pres:' is to be able to address a target user (a publisher or recipient) without taking into account the communication technology (i.e. the communication protocols) the target user is using, or, more specifically, the communication protocol that is used to contact the server that in turn communicates with the target user using potentially yet another protocol, as set out in the above-mentioned draft-ietf-impp-cpim-03.

In IMS as specified by 3GPP Release 5, the use of SIP URIs with schemes other than 'sip:' and 'tel:' is not taken into account. Thus, it is not possible to handle SIP messages with schemes other than 'sip:' and 'tel:' properly in a 3GPP Release 5 compliant network.

More specifically, in a 3GPP Release 5 IMS network according to the prior art, an I-CSCF (Interrogating CSCF) server is responsible for finding the S-CSCF assigned to a target user (or resource) based on the request-URI, and the I-CSCF does so by querying an HSS (Home Subscriber Server) database; the I-CSCF assumes that the request URI can be matched to the information contained in the HSS database. Such a match occurs when the request-URI is a SIP URI representing some registered IMS user, but if the request-URI uses a protocol-agnostic scheme, there will be no match according to the prior art.

Assuming that the IMS allows an SIP message for a target user with a request URI using a non-SIP scheme to be routed up to the target-side I-CSCF (which the current Rel5 compatible IMS does not allow), what is still needed is a change to 3GPP-specified IMS allowing the use of protocol-agnostic schemes, i.e. a change resulting in a message having an address with a protocol-agnostic scheme being routed through the IMS up to either a border gateway or to the target user, and so allowing the routing of messages having other than "sip:" and "tel:" as schemes.

DISCLOSURE OF THE INVENTION

Accordingly, in a first aspect of the invention, a method is provided for use by an entity of an Internet Protocol Multimedia Subsystem (IMS) network in resolving an address of a request according to session initiation protocol (SIP) but having a request uniform resource identifier (URI) for indicating the address having a protocol-agnostic scheme, the method characterized by: a step of querying a scheme mappings data store, performed in response to receiving the request, the querying for determining possible mappings to trial schemes for resolving the address; and a step of testing in turn, as necessary, each possible trial scheme, the testing based on comparing an address using the trial scheme with an address in an addresses data store.

In accord with the first aspect of the invention, the the scheme mappings data store may relate at least one protocol-agnostic scheme to a mapping scheme indicating a particular protocol.

Also in accord with the first aspect of the invention, the querying of the scheme mappings data store may result in an address of a gateway for a non-SIP scheme.

Still also in accord with the first aspect of the invention, if the trial scheme is a non-SIP scheme, the step of testing may be omitted, and instead an address may be determined using the non-SIP scheme and based on information available without referring to an external data store.

Even still also in accord with the first aspect of the invention, if the trial scheme is a non-SIP scheme, the step of testing may be omitted, and instead an address of a gateway may be provided with the non-SIP scheme in the step of querying the scheme mappings data store.

In a second aspect of the invention, an apparatus is provided comprising means for performing the steps performed according to the first aspect of the invention.

In third aspect of the invention, a system is provided, comprising a call state control function (CSCF) having means for performing the steps according to the first aspect of the invention, a data store (of scheme mappings, a data store of addresses, and a plurality of other CSCF elements.

In a fourth aspect of the invention, a system is provided, comprising an entity of an Internet Protocol Multimedia Subsystem (IMS) network and also comprising a data store for storing one or more schemes and respective optional associated addresses of next hop network entities in a table in which the schemes are related to a protocol-agnostic scheme, the data store for providing the one or more schemes and the respective optional associated addresses of the next hop network entities in response to a query from the entity of the IMS network, the query including a protocol-agnostic scheme.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides a way to handle a protocol-agnostic scheme in the request-URI of an SIP message in a 3GPP IMS network, and in particular in the I-CSCF of such a network. According to the invention, a mapping table containing (ideally all) possible mappings (i.e. trial schemes) for existing protocol-agnostic scheme is made accessible to I-CSCF for use in resolving a scheme, i.e. in searching for the S-CSCF of a target user.

Figure 1:
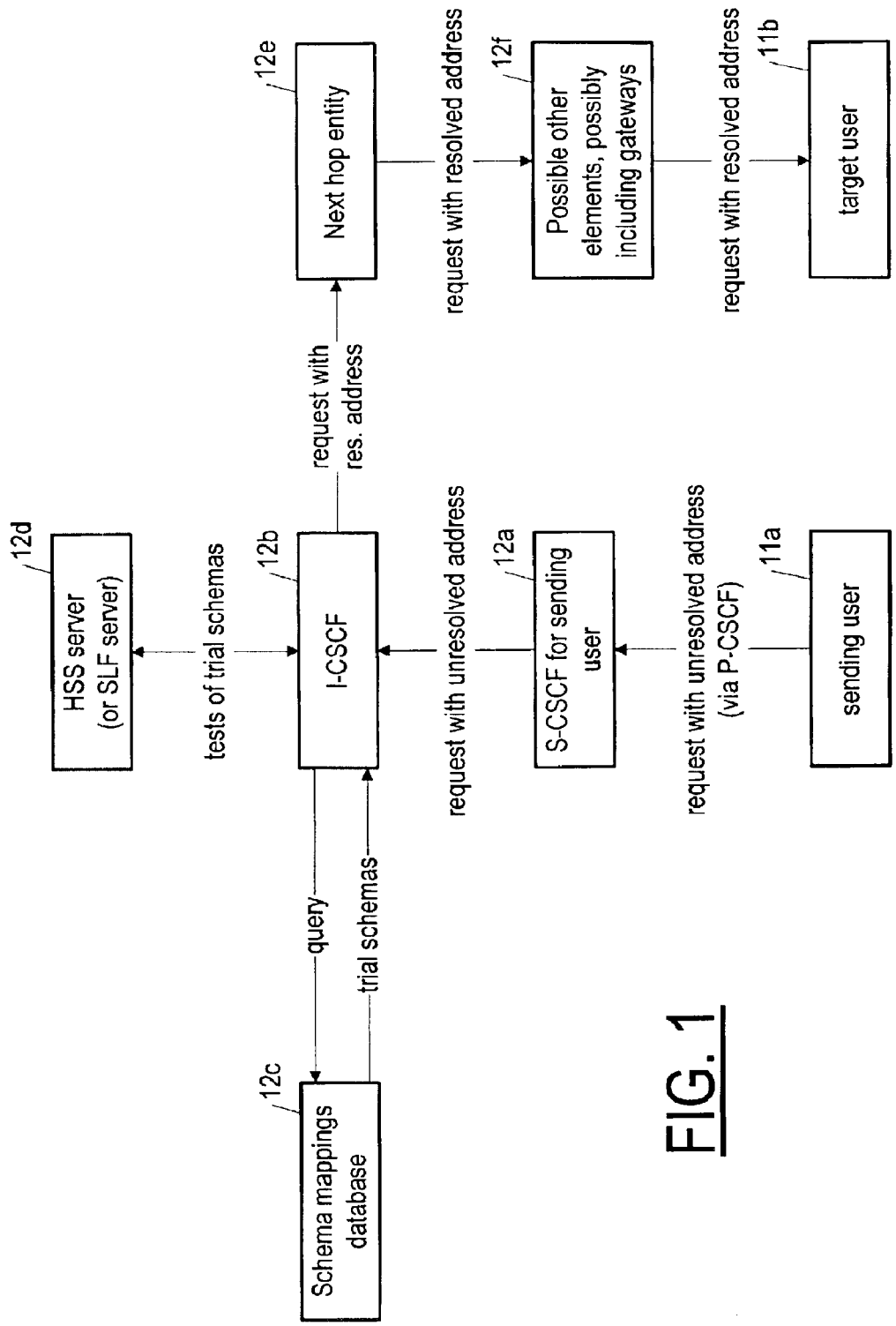
FIG. 1 is a block diagram/flow diagram of an IMS network with elements operating according to the invention so as to deliver a request with an unresolved address (because of the address scheme) from a sending user to an intended destination (target user)

Referring now to FIG. 1, according to the invention, a sending user 11a that is connected (via a RAN, not shown) and via a P-CSCF (not shown) to an S-CSCF 12 of an IMS network, transmits a message intended for a target user 11b that may or may not be a client of the same IMS network to which the sending user 11a is connected, and may in fact be connected to a different kind of network, such as a WV network, in which case the target user 11b is coupled to the sending user 11a by a series of elements of different networks, including one or more gateways. The different elements 12a–f indicated in FIG. 1 may be in different networks as specified in the 3GPP specifications.

Where both the sending user 11a and target user 11b are IMS clients, the sending user 11a is, in general, connected to a P-CSCF in the visited IMS network (a first network), and the P-CSCF is connected to the S-CSCF 12a of the home IMS (a second network) of the sending user 11a and from there to the I-CSCF 12b of the home IMS either in the originating or in the destination IMS network and finally to the S-CSCF (indicated as the next hop entity 12e in FIG. 1) of the target user. The I-CSCF labeled as 12b in the figure is typically in the IMS network (a third network) of the target user. Thus, it should be understood that even in the case that the communicating users 11a 11b are both IMS clients, the invention is not restricted to the case that the sending and target users 11a 11b are non-roaming and located in the same IMS network.

Still referring to FIG. 1 in the general case in which the target user 11b is not necessarily even an IMS client, the message transmitted by the sending user (IMS client) 11a is formed and communicated according to SIP and arrives (via a P-CSCF) at the originating S-CSCF 12a serving the sending user 11a. The originating S-CSCF 12a transmits the message to an I-CSCF 12b (in the target domain) for routing to the target user 11b. Assuming that the message has a request URI with a protocol-agnostic scheme, the I-CSCF 12b queries a scheme mappings database 12c to determine possible mappings (trial schemes) for the non-SIP (and protocol-agnostic) scheme, and then, using in turn (until success or failure) each mapping (trial scheme) found in the scheme mappings database 12c, queries the HSS (database/address directory) 12d (or the so-called SLF database in some IMS implementations) or some other directory in order to determine if the mapping (trial scheme) produces the next hop entity 12e (the target S-CSCF or some gateway) to which the message is to be passed, i.e. to complete the task of resolving the address. When the I-CSCF does resolve the address and so determines the next hop entity 12e, it transmits the message to the next hop entity 12e. To reemphasize, if the I-CSCF 12b does not find a scheme that provides an address for an S-CSCF for the target user (i.e. if the target user is not an IMS client) but finds an alternative mapping in the schemes mapping database 12c yielding an address for an associated gateway, the I-CSCF will forward the message to the gateway.

Figure 2:
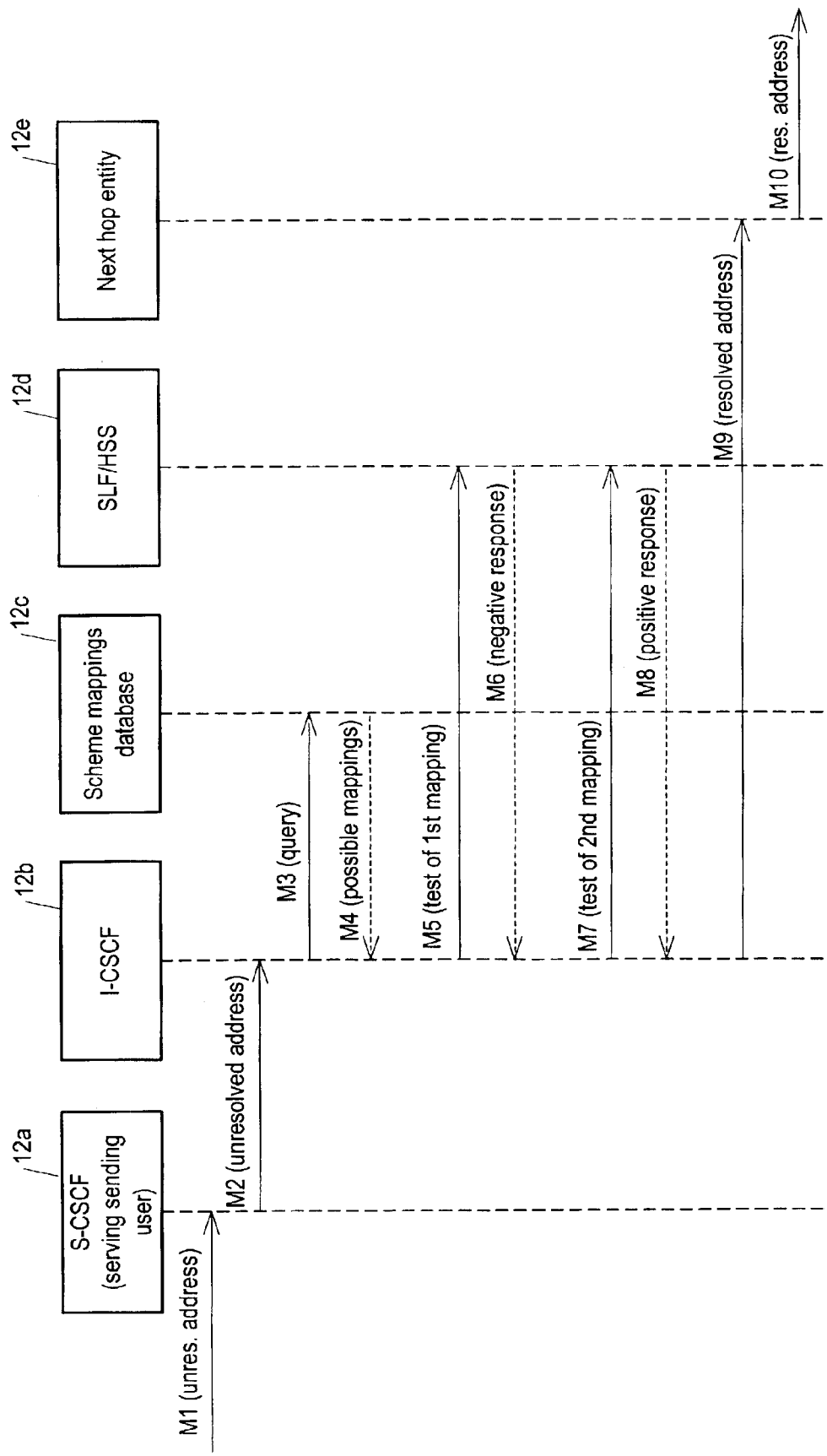
FIG. 2 is a message sequence diagram indicating a sequence of messages passed between the IMS elements of FIG. 1 in delivering the request with an unresolved scheme to the intended destination.

Referring now to FIG. 2, a message sequence diagram is shown for a scenario involving the entities appearing in FIG. 1 and in which a URI 'im:user@domain' (the unresolved URI) is resolved to the URI 'wv:user@domain' (the resolved URI). In messages 1 and 2 a request from the sending user 11a (i.e. e.g. a message providing a multimedia message) directed to the target user 11b is routed to the I-CSCF 12b via the originating S-CSCF 12a. Message 3 is a query of the scheme directory 12c by the I-CSCF 12b to determine possible mappings (trial schemes) according to some ordering criteria, such as most likely; the query is made only after the I-CSCF finds that it does not know the unresolved address 'im:user@domain' in the message from the originating IMS client 11a. Message 4 is the query result, assumed here for illustration to be: "sip, wv" (in that order). Message 5 is a test by the I-CSCF 12b of the 'sip:' scheme, i.e. the I-CSCF uses 'sip:user@domain' to search for the target S-CSCF 12e; to test the first mapping (trial scheme), the I-CSCF sends message 5 to the HSS (database) 12d to determine whether the mapping results in a valid address (for the next hop entity 12e, which would be an S-CSCF entity in case of using the scheme "sip:"). In message 6, the HSS responds in the negative. Thus, an SIP address was not found from HSS and so the target user 11b is not an IMS client but is likely instead a WV client (since that is the only other scheme found), and the request should go through a next hop entity 12e (possibly an S-CSCF or a WV/IMS gateway) and then possibly to other entities 12f including possibly a WV/IMS gateway. In message 7, the I-CSCF 12b tries an address using the second mapping, i.e. 'wv:user@domain' (i.e. message 7 communicates an address based on the second mapping to the HSS 12d) and this time the HSS responds in message 8 with a positive response, indicating the name of the next-hop entity 12e (e.g. an S-CSCF or an IMS/WV gateway) that will take care of dispatching the request forward. In message 9, the I-CSCF 12b routes the request to the next-hop entity 12e. Eventually, the request arrives at the target user (e.g. a WV client). In case the target user 11b is a WV client, as mentioned there is likely a WV/IMS gateway, often called a WV/PMG gateway, and, in addition, at least one WV server in the communication path leading from the I-CSCF 12b to the target user 11b.

It should be understood that the testing of the various possible scheme that might resolve an address can be done by using different databases hosted by different entities, besides the HSS or SLF entities.

The logical steps performed by the I-CSCF when finding a non-SIP scheme are as follows. The I-CSCF queries the scheme mapping database to obtain schemes to which the protocol-agnostic scheme (e.g. "im:" or "pres:") are mapped. The I-CSCF receives a response from the scheme mapping database, a response that contains multiple schemes (e.g. "sip:" and "wv:") and in case of non-SIP schemes (e.g. "wv:") the response can also contain the address of the network element or gateway that can handle an address having such a scheme.

In case the response contains a "sip:" scheme, the I-CSCF includes logic that has the I-CSCF query HSS to obtain the S-CSCF address for the target user. That logic can also indicate that if the scheme is "wv:" there is no need to query the HSS and instead the address is to be forwarded to the IMS/WV gateway (or some other gateway), which address can be returned in the scheme mappings database response or it can be statically configured in the I-CSCF. Alternatively, in case of a non-SIP scheme, instead having logic in the I-CSCF to forward to the IMS/WV gateway (or some other gateway), the I-CSCF can query the HSS with the non-SIP scheme as in the embodiment described above in connection with FIG. 2. If the HSS (that includes SLF functionality) does not return an address for the non-SIP query, the I-CSCF then use another directory for querying with the received schemes to obtain an address of a next-hop entity (e.g. the IMS/WV gateway) that can handle the message. (SLF functionality uses a table of addresses of the different HSSs for different users of IMS and a list of users that are stored in each HSS.) If all these queries fail, then an error message is sent to the user.

Figures 3, 4:
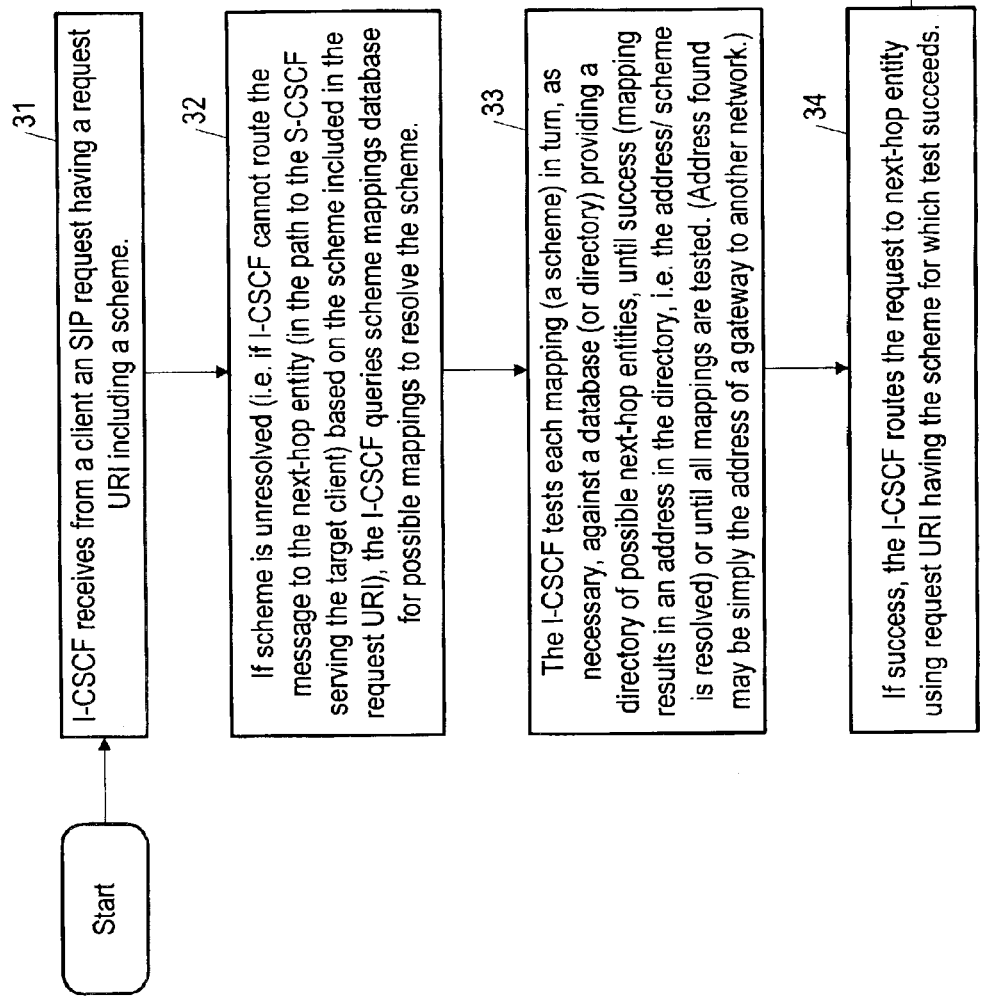
FIG. 3 is a flowchart illustrating the operation of an I-CSCF server according to the invention.
FIG. 4 is a schematic diagram of a scheme mappings database used in the method illustrated in FIG. 3 and indicated in FIGS. 1 and 2.

Referring now also to FIG. 3, a flowchart of a method of operation, according to the invention, of the I-CSCF 12b is shown as having a first step 31, in which the I-CSCF 12b receives (via a S-CSCF server 12a) from the target user 11a a SIP request having a request URI including a scheme of one or another type. In a next step 32, if the I-CSCF 12b cannot resolve the address (i.e. if the I-CSCF cannot route the message to a next hop entity 12e, such as an S-CSCF 12e serving the target user 11b or possibly a gateway, in the path to the target user 11b with the address having the scheme included in the request URI), then the I-CSCF 12b queries the scheme mappings database 12c (FIG. 1) for possible mappings to resolve the scheme. In a next step 33, the I-CSCF 12b tests each mapping (a scheme) in turn against a database (or directory) (such as a database hosted by the HSS server 12d) providing a directory of S-CSCFs or other possible next hop entities, until success (mapping results in an address in the directory, i.e. address is resolved) or until all possible mappings are tested. In a next step 34, if a mapping is found to be successful, the I-CSCF 12b routes the request to the next hop entity 12e so found (e.g. the S-CSCF serving the target user 11b or serving as the next hop in the path to the target user 11b, a path that may include one or more gateways) using the request URI having the scheme for which the testing of step 33 is found to be successful.

Referring now to FIG. 4, the scheme mappings database 12c (FIG. 1) is shown as e.g. a table 41 relating various protocol-agnostic schemes ('im:' and 'pres:') to possible mappings (trial schemes), i.e. to scheme that may result in a valid address for the target S-CSCF, i.e. the S-CSCF appropriate for routing a request to a target IMS (or other domain) client. (The order of the mappings in the table is useful in prioritizing the mappings.) The table 41 also includes optional addresses of next-hop entities for non-SIP schemes for use as described above (so that in case the SIP address fails, the message is simply forwarded to the address included in the table 41 for the non-SIP scheme rather than first testing an address using the non-SIP scheme).

Thus, according to the invention, when an I-CSCF receives an SIP request from a sending user for a target user and the request has a request-URI containing a protocol-agnostic scheme (resulting in the address of the request-URI being unresolved), the I-CSCF consults a directory or configuration file (called here a scheme mappings database) containing possible mappings (in order according to some predetermined preference) for the unresolved address (mappings to other schemes that might result in a valid address for a next hop entity, which may be the S-CSCF for the target user), and then searches for the next hop entity most appropriate for forwarding the request on to the target user. The same databases that store the different schemes may store the addresses of the gateways associated with the different schemes; also, the SLF/HSS (database/address directory) may be used for IMS clients but some other database may be used for other schemes. The searching is performed by testing each possible mapping in turn using conventional means, i.e. e.g. the HSS (or SLF) database. When a match is found, the request URI is converted so as to use the scheme producing the match and the request is then sent forward.

It should be noted that the invention is not limited in its scope to existing protocol-agnostic presence and messaging related schemes. It is applicable to future IMS protocol-agnostic schemes; the functionality provided by the invention should be added to IMS network elements to make possible handling different addressing schemes included in IMS messages (i.e. SIP messages).

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by an entity (12b) of an Internet Protocol Multimedia Subsystem (IMS) network in resolving an address of a request according to session initiation protocol (SIP) but having a request uniform resource identifier (URI) for indicating the address having a protocol-agnostic scheme, the method characterized by:

a) a step (32) of querying a scheme mappings data store (12c), performed in response to receiving the request, the querying for determining possible mappings to trial schemes for resolving the address; and b) a step (33) of testing in turn, as necessary, each possible trial scheme, the testing based on comparing an address using the trial scheme with an address in an addresses data store (12d).

2. A method as in claim 1, wherein the scheme mappings data store (12c) relates at least one protocol-agnostic scheme to a mapping scheme indicating a particular protocol.

3. A method as in claim 1, wherein the querying of the scheme mappings data store (12c) results in an address of a gateway for a non-SIP scheme.

4. A method as in claim 1, wherein if the trial scheme is a non-SIP scheme, the step (33) of testing is omitted, and instead an address is determined using the non-SIP scheme and based on information available without referring to an external data store (12c 12d).

5. A method as in claim 1, wherein if the trial scheme is a non-SIP scheme, the step (33) of testing is omitted, and instead an address of a gateway is provided with the non-SIP scheme in the step (32) of querying the scheme mappings data store (12c).

6. An apparatus (12b), comprising means or performing the steps (32 33) of claim 1.

7. A system, comprising a call state control function (CSCF) (12b) having means for performing the steps C (32 33) of claim 1, a data store (12c) of scheme mappings, a data store (12d) of addresses, and a plurality of other CSCF elements (12a 12e).

8. A system, comprising an entity (12b) of an Internet Protocol Multimedia Subsystem (IMS) network and also comprising a data store (41) for storing one or more schemes and respective optional associated addresses of next hop network entities in a table in which the schemes are related to a protocol-agnostic scheme, and for providing the one or more schemes and the respective optional associated addresses of the next hop network entities in response to a query from the entity (12b) of the IMS network, the query including a protocol-agnostic scheme.

* * * * *

UNITED STATES PATENT AND TRADEMARK OFFICE
CERTIFICATE OF CORRECTION

PATENT NO. : 6,931,453 B2
DATED : August 16, 2005
INVENTOR(S) : Aarnos et al.

It is certified that error appears in the above-identified patent and that said Letters Patent is hereby corrected as shown below:

Column 8,
Line 24, please delete "or" and substitute -- for -- therefor.
Line 27, please delete "the steps C (32 33)" and substitute -- the steps (32 33) -- therefor.

Signed and Sealed this

Twenty-fifth Day of October, 2005

JON W. DUDAS
*Director of the United States Patent and Trademark Office*